Oct. 17, 1967    E. P. G. RAHN ETAL    3,347,423
CONTAINER AND ITS COMPONENTS FOR AEROSOL PRODUCT
Filed July 7, 1966            4 Sheets-Sheet 1
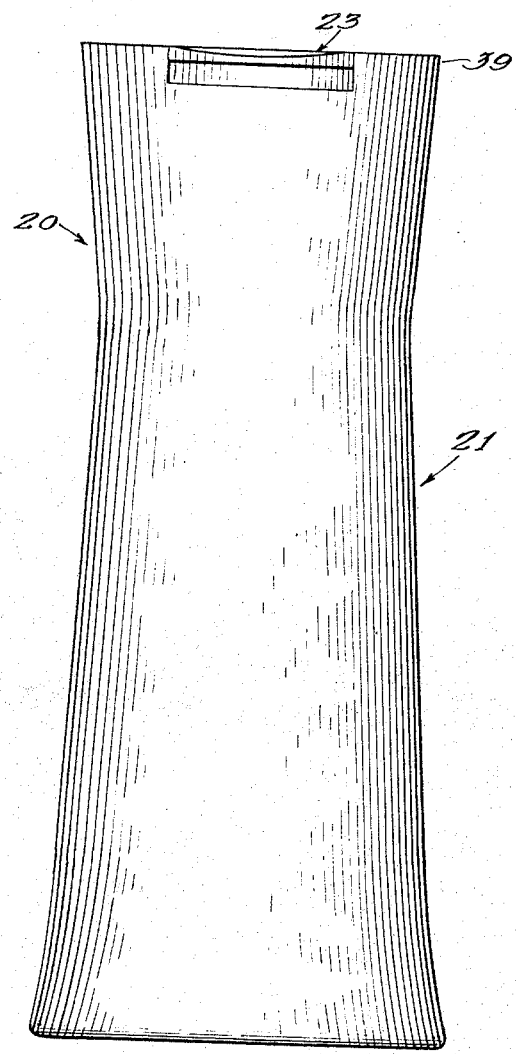
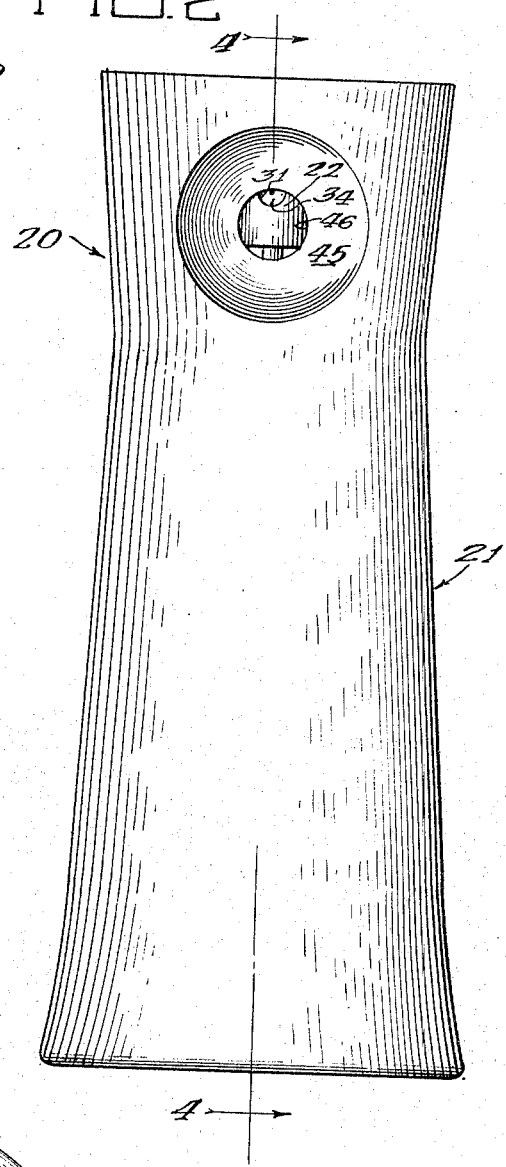
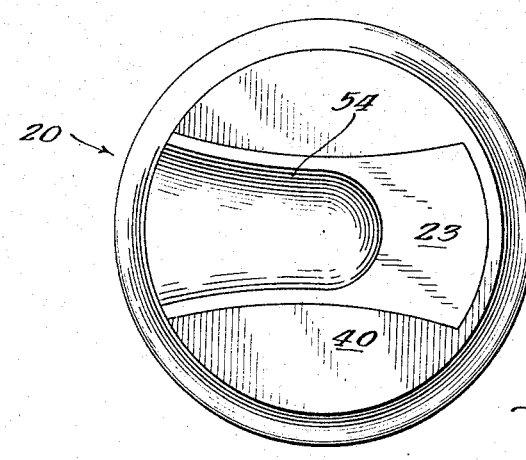
Inventors:
Erwin P. G. Rahn
Saul A. Babbin
By: Zabel, Baker, York,
Jones & Dithmar
Attorneys

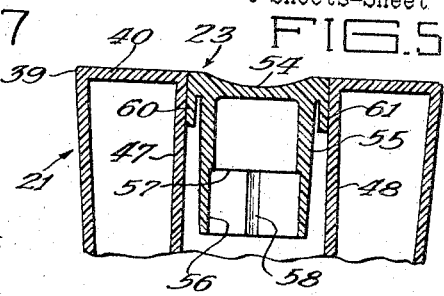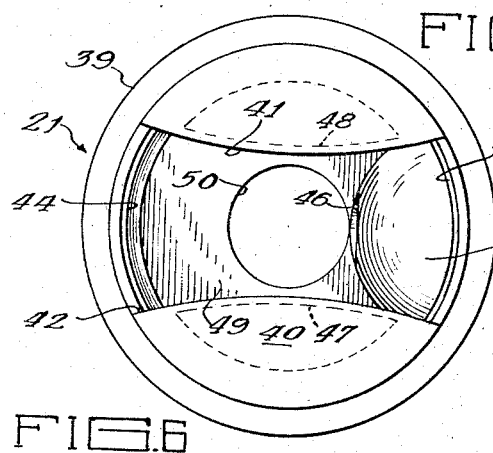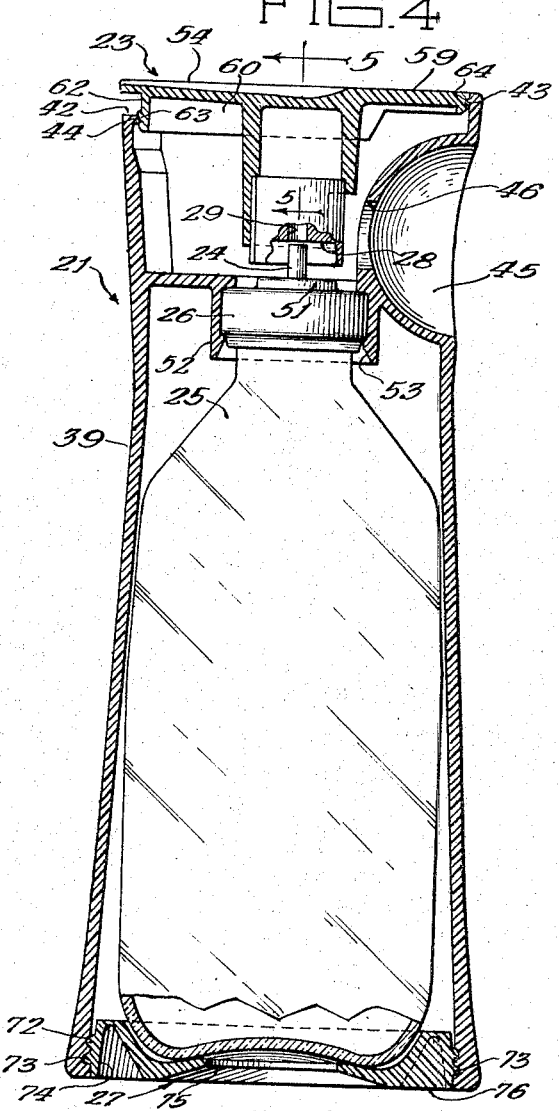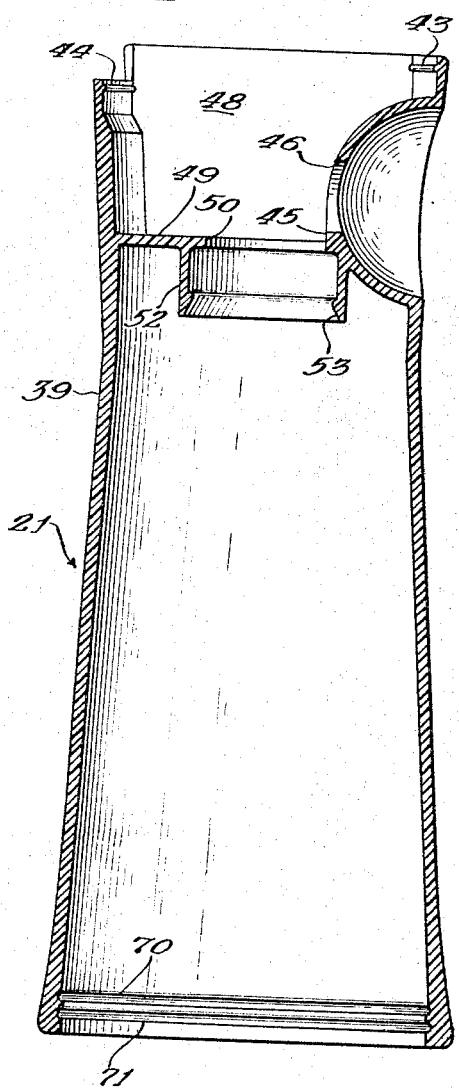

Oct. 17, 1967  E. P. G. RAHN ETAL  3,347,423
CONTAINER AND ITS COMPONENTS FOR AEROSOL PRODUCT
Filed July 7, 1966  4 Sheets-Sheet 3
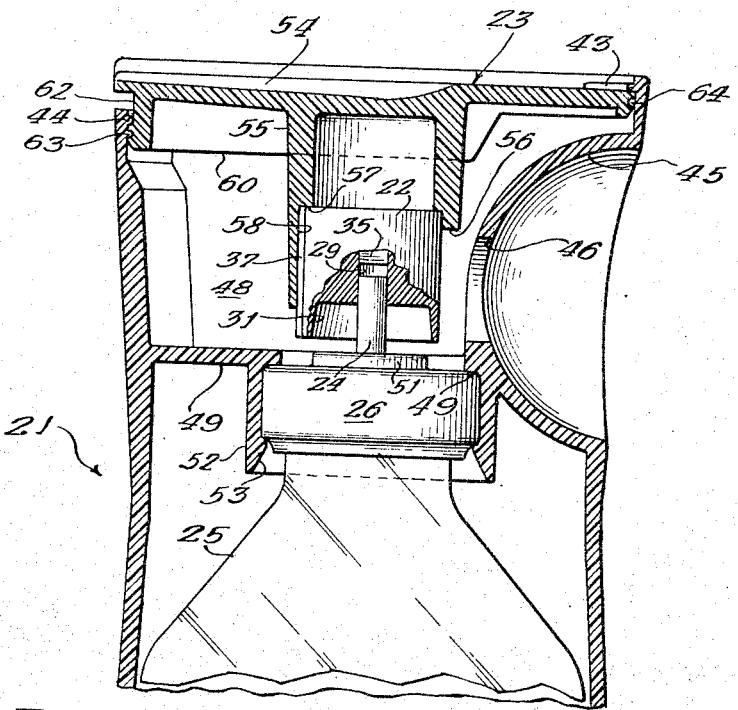
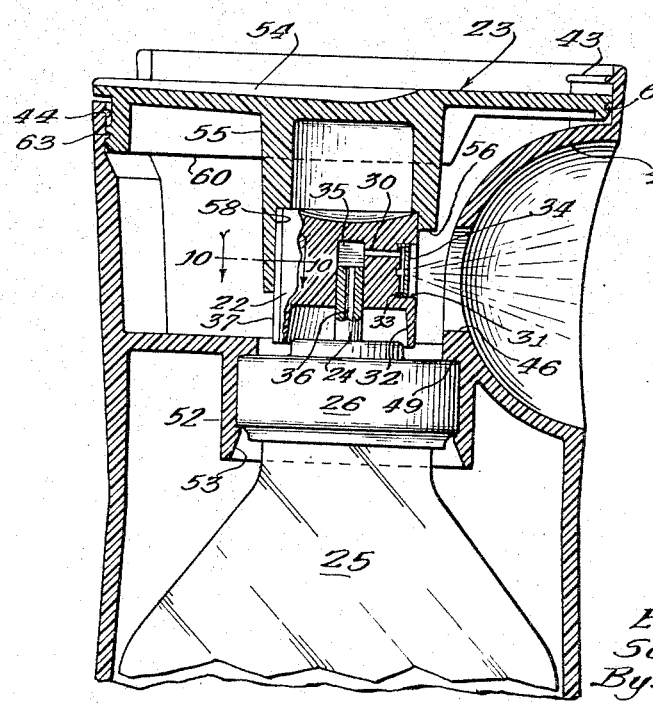
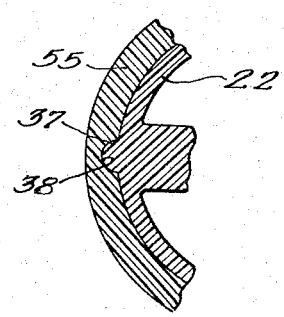
Inventors:
Erwin P. G. Rahn
Saul A. Babbin
By: Zabel, Baker, York,
Jones & Dithmar
Attorneys Oct. 17, 1967

E. P. G. RAHN ETAL 3,347,423

CONTAINER AND ITS COMPONENTS FOR AEROSOL PRODUCT

Filed July 7, 1966

Inventors:
Erwin P. G. Rahn
Saul A. Babbin
By: Zabel, Baker, York,
Jones & Dithmar
Attorneys

United States Patent Office 3,347,423
Patented Oct. 17, 1967

3,347,423
CONTAINER AND ITS COMPONENTS FOR
AEROSOL PRODUCT
Erwin P. G. Rahn, Pittsford, and Saul A. Babbin, Henrietta, N.Y., assignors to Wallace & Tiernan Inc., East Orange, N.J., a corporation of Delaware
Filed July 7, 1966, Ser. No. 563,502
26 Claims. (Cl. 222—183)

ABSTRACT OF THE DISCLOSURE

A package for aerosol products has a frangible container within a tubular shell having a bottom opening in which is located a disk and a partially open flat top. The shell has an opening at its front near the top and above a transverse wall that has an integral depending hollow boss engaging the top of the container spaced from the shell but centrally supported by the disk and the boss. A valve actuator is supported by the shell in the partial top opening and its downward movement is guided by a pair of vertical walls integral with the top and transverse walls.

---

There are many products on the market that are packaged in the form of aerosols. The term "aerosol" as presented on the commercial market may be defined "as a container whose contents are expelled through an opened valve by means of an internal pressure of the materials contained therein." The products issuing forth may be in the form of a spray, fine mist, entirely gaseous or a combination of liquid and/or solid and gaseous components.

The spray is obtained from a container that contains this product usually with a propellant that is under pressure in the container. It is common to provide as the propellant a material that is generically referred to as a halohydrocarbon or a mixture of such compounds. These materials as a class of halohydrocarbons are sold, e.g., under the trademark Freon. As propellant, one may use compressible gases such as nitrogen, carbon dioxide, nitrous oxide, etc. One may also use hydrocarbon gases, such as propane and butane. These gases may be used singularly or in combination.

In addition to these methods of expelling materials from a package that is generally referred to as an aerosol, one can use mechanical pressurization from a piston-and-spring arrangement.

When a propellant is used, the container is filled under pressure with the product in the propellant which is in liquid form. The packaged product at ambient temperature provides an elevated pressure from several pounds to 70 pounds per square inch gauge (p.s.i.g.) or higher, generally in excess of 25 and up to 70 p.s.i.g., in the container.

The container for an aerosol product is provided with a valve assembly, which in some constructions is spring loaded so that the valve is normally closed. The valve assembly includes an outwardly extending tubular stem. When this stem is moved axially toward the valve of the assembly the valve is opened. The aerosol product passes out through the hollow or tubular stem through a spray button on the stem. The button has a very small opening as a discharge opening through which the aerosol product is emitted to form the spray.

One type of valve assembly provides continuous flow of the aerosol product from the container until the stem is permitted to retract from the valve. Another type of valve assembly provides flow through the stem of only a metered amount of aerosol product for a valve actuation even though the stem is not retracted. In these valve assemblies the movement of this stem is at least partially an axial movement. Another type of valve assembly requires a tilting movement of the stem in any direction to open the valve. This type of valve assembly is usually used to dispense pressurized emulsions, including wax emulsions and whipping cream, directly from the open end of the stem.

U.S. Patents Nos. 2,906,462 and 2,948,439 disclose the disadvantage of using an unprotected container of a rigid, frangible material, such as glass, to package aerosol products. Glass has the advantage, as a container, of providing protection against deterioration of the product because glass is relatively inert to many chemical products, including those usually packaged as aerosols. However, glass containers for pressurized products present the hazard of flying glass in case of accidental breakage of the glass container. These patents indicate that prior to their development the trade had shifted away from glass containers that were used initially to use metal containers entirely for the packaging of aerosols. At 70° F. commercial, consumer-used metal containers can withstand internal pressures up to 70 p.s.i.g.

Although glass aerosol bottles (hereinafter usually referred to as bottles, glass bottles or glass containers) of proper design can withstand internal pressures statically in excess of 150 p.s.i.g., the general glass industry recommendations for filling glass containers have confined the tolerable internal pressures at 70° F. to 15 p.s.i.g. for uncoated glass bottles and 25 p.s.i.g. for coated glass bottles. The main reason for these limitations is that higher pressures result in more dangerous glass fragmentation in the event that the bottle is broken by dropping or some other impact force.

The lower pressures required by safety for aerosols in coated glass containers necessitated the use of special mechanical contrivances to provide a fine spray mist. Many products as aerosols using such low pressure are unsatisfactory regardless of the mechanical system that was used.

U.S. Patent No. 2,906,462 discloses a container that overcomes the hazards of using glass by providing the glass container with a continuous sheath of a synthetic, resinous, elastomeric, elastically expansible material, such as plasticized polyvinyl chloride. This sheath freely overlies substantially the entire exterior surface of the glass container or bottle and is in close conformity with the bottle. The sheath is necessarily secured to the surface of the glass container in pressure-proof sealing engagement adjacent the discharge opening or mouth of the bottle. The composite container of this patent is required to have at least one vent in the outer container or sheath and this vent is located so that when the glass container is broken, pressurized gas initially within the container is exhausted while the sheath itself retains fracture fragments of the glass bottle. It is alleged that this is possible because the sheath has sufficient tensile and tear strength to withstand the initial explosive force when the glass bottle breaks and the sheath serves to confine the glass fragments within it, even though the sheath is expanded to a substantial extent. With this construction it is claimed that after the gas pressure has been released through the vents, the sheath will retract to substantially its original unexpanded condition.

U.S. Patent No. 2,948,439 provides an improved structure with respect to the first patent by minimizing the likelihood of fracturing the glass bottle. This is accomplished by providing the glass bottle with areas of increased thickness, in the form of ribs, at locations where fracture by impact is likely to occur, and of course the elastic sheath of material overlies the entire glass container, including these ribs, in the same manner as outlined by the earlier patent mentioned above. Additional securing of the sheath at its top end is also provided.

The constructions of the containers of these two patents provide only at best a small amount of protection of the glass bottle against breakage by dropping or other impact force.

The dispensing containers of the two foregoing patents utilize an interior glass container, that has an advantage over metal containers in that the package can be easily manufactured in a wide variety of external shapes. Glass containers are formed from glass gobs by either press-and-blow or blow-and-blow operations that are well known in the glass industry. The manufacture of metal containers does not provide this versatility. Most of the metal containers are made with a straight sidewall as the main body portion which is sealed to a top portion that is usually frustoconical in shape. The upper part of the top portion has a smaller diameter to provide a suitable opening for mounting the valve assembly.

An aerosol metal container is usually provided with an overlying cap that engages the top of the can often at the juncture between the main body portion of the can and the top portion of the can. This cap encloses the upwardly extending outer stem of the valve assembly and the spray button mounted on that stem. The cap of this simple construction merely serves to prevent accidental actuation of the spray button by preventing its axial movement so long as the cap is in place. However, this simple cap must be removed to dispense aerosol product from the container.

To avoid this disadvantage of a simple cap mounted on a metal container, various designs of construction of caps have been developed. Many types have an opening in its sidewall in alignment with the orifice of the spray button or special valve actuator that extends into the opening. This orifice of the button is at an angle, usually normal, to the longitudinal axis of the container. The cap is also provided with a recess in the top wall. The button extends up in this recess or there is a special valve actuator in the recess that is joined to a regulator spray button or includes an orifice and communicating bores in its construction. U.S. Patents Nos. 3,153,497 and 3,227,321 are representative of patents that disclose such cap constructions and special valve actuators that replace conventional spray buttons. These provide an aerosol product through an outlet of the spray component that is normal to the longitudinal axis of the container.

U.S. Patent No. 3,006,510 is another patent that discloses a modified cap. Below the top surface of the cap at its central opening is the top of a modified valve actuator that has a radially extending orifice to direct a spray through an orifice in the sidewall of the cap. The central section of the top wall of the cap is offset below the peripheral portion of the top wall. This construction permits stacking of the containers without inadvertent operation of the valve actuator, if the bottom of the container is of suitable configuration, such as being flat. A sticker or label is adhered to the valve actuator and the top wall of the cap. It must be removed to operate the valve actuator.

In some cases the valve actuator of prior aerosol packages is constructed so that the spray leaves the actuator in a direction that is angular, other than normal, to the longitudinal axis of the container. An example is disclosed in U.S. Patent No. 3,157,321. Only part of the top wall of the cap is present and its angular extension of a segment of the sidewall. The valve actuator provides the main part of the top surface of the package.

Some caps for the metal containers are constructed with a recess in the top wall and part of the sidewall to receive a valve actuator. Its top surface provides in effect a continuation of a dished surface in the top wall. The valve actuator either is hingedly connected to the cap or is connected to the cap by webs of material at various locations around the periphery of the opening in the top wall of the cap. These constructions are disclosed in U.S. Patents Nos. 3,058,626, 3,185,349, 3,195,783, and 3,199,- 741. In many cases the cap is constructed with a dished top surface extending from the side opposite to the orifice from which the spray emanates. When the countainer is held to place a finger on the dished surface, the spray orifice is pointing in the right direction.

U.S. Patent No. 3,107,033 discloses a cap that is recessed in the top wall and at opposite locations of its sidewall for receiving, above the dished surface, a cover cap for the spray button. It is easily reached by a finger. When the button is depressed, spray is emitted across the top surface of the dished portion of the cap. The cover cap for the button has direction indicia and cooperating structure with the opening in the top wall of the main cap to prevent undesirable rotation of the spray button relative to the main cap mounted on the metal container.

Most of the recent patents in this field of aerosol packages including caps and metal containers disclose a construction to assist the operator in determining how to hold the can for proper direction of the spray to be emitted. Usually there is a concave top surface on the valve actuator to place an operator's finger for movement of the valve actuator so that the orifice of the spray points in the intended direction. Further examples of a disclosure of such construction is U.S. Patent No. 3,231,142. In that case the valve actuator is received in a recess in the top wall and complementary recesses at opposing locations in the sidewall. The top surface of the valve actuator is kept below the flat top surface of the cap.

A couple of the issued U.S. patents has disclosed caps, generally of one or more of the types described above, in combination with an integral sheath of somewhat resilient material that surrounds the main body portion metal can or even, apparently, a glass container. One of these patents is U.S. Patent No. 3,139,223 in which the sheath extends above the container to provide a unitary cap having a top wall with a pair of parallel slits between which the top wall supports a valve actuator. The slits extend from front to rear. The top wall outside the slits supports a pair of depending short flanges. These flanges merely serve as guide walls. In this construction the valve actuator can be moved down manually because the sheath sidewalls are resilient material and thus bend easily. Upon removal of manual pressure, the sidewalls straighten to lift the valve actuator. The sheath is open at the bottom end and receives a base plug that supports the glass container at the periphery of its base. This structure is also shown generally in U.S. Patent No. 3,107,826. In that package the front end of top wall segment that supports the valve actuator is connected to a front top segment of the sidewall that is not connected to the rest of the sheath. Thus this part of the top wall is hingedly connected to the sheath at the rear of the valve actuator.

U.S. Patent No. 2,966,283 discloses a package including a sheath made of several parts, two of which are telescoped together in the final container. The top one-half of the sheath supports and may be integral with the valve actuator so that there is no relative movement between them. This top one-half has an opening in its sidewall to permit the emission of spray from the valve actuator. The bottom end of the lower one-half of the telescoped sheath is open to permit manual raising of the glass container within. Such movement pushes the stem of the valve assembly against the valve actuator. Because movement of the latter is prevented by the upper component of the telescoping sheath there is relative movement between the valve stem and the rest of the valve assembly to open the valve of the latter.

U.S. Patent No. 3,198,399, discloses a package for aerosol in a container that may be a glass container that is surrounded by a sheath preferably formed of metal and that is open at its top end and closed at its bottom end. The inner container is supported on a pad of foam rubber or other cushioning material. The top of the sheath and a telescoping cap, generally of the type disclosed above, support a clip that engages the closure mounted on the inner container to maintain the latter spaced from the walls of the sheath. To assemble this package the pad is placed in the bottom of the sheath. The inner container with its aerosol product is placed into the jacket of the sheath. The valve actuator is already mounted on the stem of the valve assembly on this container. The cap is then placed over the valve actuator and engages the top of the sheath. The valve actuator extends through a recess in the top wall and sidewall of the cap and its orifice extends through an opening in the sidewall opposite to the recess in the latter. Its movement is guided by the walls of the cap.

The foregoing U.S. patents are believed to be representative of the prior art that is primarily directed to containers for aerosol products in metal containers except for the two patents that were mentioned first. Two of the patents apparently indicate constructions that permit utilization of glass containers or containers of other rigid frangible material, but these constructions utilize metallic sheaths to avoid glass breakage and thus the hazards of glass fracture. None is believed to provide a construction that permits the use of a glass container, with its advantages mentioned above, for packaging the product and yet provides reduced probability of breakage and adequate protection against glass fragments formed by breakage if it occurs.

The use of aerosols to apply various products has increased substantially in the last few years. Thus it has become more important from the standpoint of a buyer-user that he obtain a "virgin" package, i.e., an unopened and unused package. Various attempts have been made to combat this problem of shopper pre-testing or shelf testing. These have added to the basic cost of the aerosol package. Lock-on, snap-off pieces have been added. Break seal or tear tabs, such as disclosed in U.S. Patent No. 3,006,510 have been added. All attempts to solve the problem have common drawbacks, including additional cost for pieces or parts, extra labor or extra machinery or both to add these devices to an existing package, and problems faced by the buyer-user. He may encounter difficulty in removing seals, tabs, etc., and insist upon returning the package. The number of returns is increasing due to packages that are improperly opened for use or that can not be entirely opened. Damage to the valve actuator can occur during some types of seal removals.

Most of the patents mentioned above fail to provide a package with a construction that prevents tampering by operation of the valve actuator, with concomitant loss of product while the packaged product is on a retailer's shelf. The construction of these packages fails to indicate that there has been such tampering. U.S. Patent No. 3,006,510 discloses a package that has a label across the top of the cap. The label does not provide complete assurance that there has not been actual use. Such label must be readily removable by the ultimate user of the packaged product. However, the label should be adhered sufficiently strongly to the cap and the valve actuator to avoid inadvertent loss during handling of the package prior to and at the retail establishment.

It is an object of the present invention to provide a package or container for an aerosol product, in which the container includes an aerosol bottle of glass or other rigid frangible material that is preferably uncoated and that directly encloses and contacts the aerosol product with a pressure in the bottle in excess of 25 p.s.i.g. and in which the overall package or container provides protection to minimize the likelihood of fracture breakage of the frangible material in the form of the bottle and also prevents release of fragments of the fractured bottle in the event of bottle breakage, thereby avoiding the hazard of damage to persons near the bottle at the time it fractures to provide such fragments.

It is another object of the invention to provide a tamper-indicating and tamper-resisting package for an aerosol product using a container of glass or other rigid, frangible material in combination with a sheath that protects that container against breakage when it receives a substantial impact, contains fragments of glass or the like in the sheath in case of breakage and serves also as a guide for a valve actuator in which the sheath is preferably of a unitary construction suitable for manufacture by molding technique.

It is a further object of this invention to provide a package for an aerosol product using an aerosol bottle of rigid, fragible material, such as glass, in combination with a valve actuator and a sheath of plastic of at least semi-rigid characteristics, in which the sheath has structure such that it can support, retain and guide in a directional manner a valve actuator and in which the sheath has, as part of its structure, means expected to improve the flow pattern of spray emanating from a conventional simple spray button that constitutes a part of the valve actuator.

Still a further object of the invention is to provide a container for an aerosol product that includes a novel valve actuator and unitary sheath that supports an aerosol-containing bottle of glass or like material at its top and bottom in a simple manner to minimize breakage of the bottle and hazard from breakage fragments, and at its top cooperates with the valve actuator to resist a tampering force and to indicate by easy visual inspection tampering of the package to the extent of at least the initial use of spray of aerosol from the package while providing packages that can be stacked on one another without inadvertently giving a false indication of tampering.

Still another object of the present invention is to provide a package for an aerosol product in which a valve assembly is used that provides, during actuation, a continuous spray of aerosol product, but with a package construction such that the spray can be stopped conveniently and easily by manually lifting the valve actuator at one end within a recess of the top of the container and utilizing a fulcrum action, in the event that the actuator becomes accidentally wedged or stuck in its depressed, actuating position.

A further object of the present invention is to provide a protective sheath, as a component of an aerosol, that provides the aforesaid functions of other objects.

Another object of the invention is to provide a package including a filled and sealed aerosol bottle of glass or other frangible material encased within and supported at the top by the sheath and securely anchored additionally at the bottom by a disk mounted at the otherwise open bottom end of the sheath and constructed to facilitate examination of the contents of the bottle without disassembly of any part of the package and to permit venting of the contents of the bottle in the unlikely event of breakage of the bottle so that there is prevented a positive pressure build-up within the sheath that would defeat the safety function of the sheath.

Another object is to provide a package that meets the foregoing objects and comprises few components that can be easily assembled with assurance that there will be no loss by spray of aerosol product during this assembly.

These and other objects of the invention will be apparent to one skilled in the art from the description of the preferred embodiment that follows, when taken in conjunction with the drawings in which:

FIGURE 1 is a rear elevation of the aerosol package or container of the preferred embodiment of the present invention;

FIG. 2 is a front elevation of the aerosol container shown in FIG. 1;

FIG. 3 is a top plan view of the aerosol container;

FIG. 4 is a vertical cross-section of the aerosol package, showing in elevation the closure, all but a bottom portion of the glass container and a fragmentary bottom portion of the spray button, viewed from the left side of FIG. 2;

FIG. 5 is a top fragmentary view of the aerosol package taken along the line 5—5 of FIG. 4 with spray button removed;

FIG. 6 is a vertical cross-section of the sheath or casement of the aerosol package taken as in FIG. 4;

FIG. 7 is a top plan view of the sheath of FIG. 6;

Figure 11:
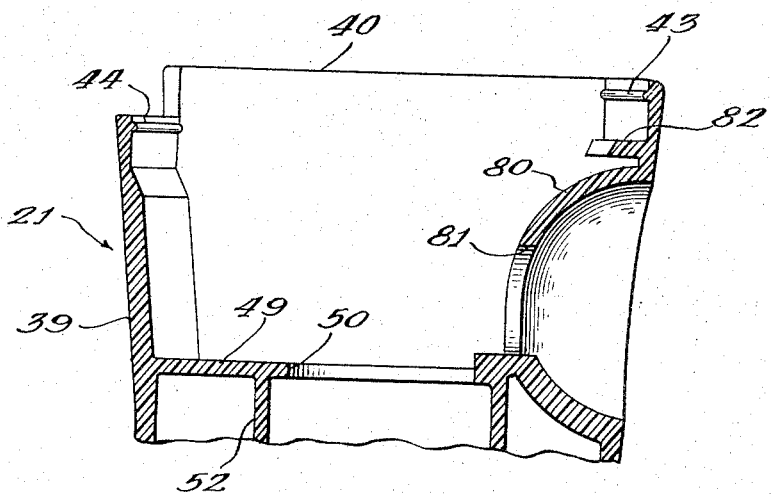

FIG. 8 is a top fragmentary vertical cross-section of the aerosol package, taken in the same manner as FIG. 4, but with the valve actuator, including the spray button and actuator overcap, at an unlodged depressed position before it is fully depressed to provide a spray of aerosol for the first time;

FIG. 9 is a top fragmentary vertical cross-section of the aerosol package, like FIG. 8, but showing the valve actuator at its maximum depressed position at which aerosol spray is emitted.

FIG. 10 is a fragmentary horizontal cross-section of the valve actuator taken along the line 10—10 of FIG. 9;

FIG. 11 is a top fragmentary vertical cross-section of an alternate embodiment of the sheath of the aerosol package which is viewed in the same manner as the sheath shown in FIG. 6; and FIG. 12 is a top fragmentary vertical cross-section of another embodiment or modification of the sheath of the aerosol package, also as taken in the same direction as in FIG. 6.

The aerosol package, generally indicated at 20, of the present invention includes: a sheath, generally indicated at 21; a spray button 22 within sheath 21; a valve actuator overcap, generally indicated at 23, connected to button 22 as described later; a valve assembly (not shown, except as stated below) including a valve hollow stem 24 that serves, when moved, to operate the valve assembly and serves as an outlet of the valve assembly; a glass bottle 25; a closure or ferrule 26 that encloses the mouth of bottle 25 and supports the valve assembly with stem 24 extending upwardly through closure 26 in sealing relationship, and a retaining disk generally indicated at 27.

The spray button 22 and overcap 23 can be a one-piece unit, but they are two pieces in the preferred embodiment because button 22, as shown, is basically a present commercial spray button used with other aerosol packages and often with a simple cap that must be removed for use of the aerosol package, as described earlier.

If one considers glass bottle 25, closure 26 and the valve assembly including its stem 24 as a single conventional assembly (ignoring the conventional lower internal pressure) unit, the package of the present invention in its simplest form comprises four other units or components, namely, spray button 22, overcap 23, sheath 21 and retaining disk 27.

The spray button 22 is generally a conventional simple type having an outer cylindrical configuration with a slight incline so that at its top its diameter is slightly less than that at the bottom. The button 22 is hollow so that it is like a cap having a top panel and a skirt. However, the interior has a web 28 that extends diagonally to opposite points of the skirt and has a depth greater than half of the depth of button 22. The thick web 28 has a vertical bore 29 at the central axis of button 22. Near the inner end of bore 29, it communicates with a horizontal bore 30 that extends radially and communicates with a larger bore 31 in web 28 and the skirt 32. The bore 30 ends near the periphery of enlarged bore 31. The inner end of bore 31 has an annular groove or recess 33 in which is pressed a circular skirt of a metal disk 34 having a central fine aperture from which spray will be emitted. As seen also in FIG. 9 the inner wall of bore 31 is provided with central recess (not numbered) for reasons well known in the art of such spray buttons. Below bore 30, a pair of shoulders 35 are provided in bore 29 and are on opposite sides of a vertical plane passing through bore 30, i.e., of the longitudinal axis of button 22. The shoulders 35 extend to the base of bore 29. The shoulders 35 limit the extent of insertion of stem 24 so as to maintain communication between bore 36 of stem 24 and bore 30 of button 22 when button 22 and stem 24 are fully connected to each other.

The button 22 differs from the previous commercial button by having a vertical rib 37 on its outer surface. The rest of the outer surface is knurled or milled as in unmodified conventional button. The rib 37 is on the diametric plane of the button passing through the central orifice of disk 34. The purpose of rib 37 is to maintain proper alignment of disk 34 relative to other components, as will be described later.

The bottle 25 has its mouth sealed hermetically by closure 26. The valve assembly supported by closure 26 is a conventional type, either for continuous flow or for metered flow and preferably the former. Only its stem 24 is shown. To the conventional valve assembly there is attached a downwardly extending dip tube (not shown) that terminates at or near the bottom corner of the bottle for maximum utilization of liquid in the bottle.

The sheath 21 is made of a plastic material and of a thickness that is semi-rigid at the temperature of use. As explained later, the sheath of the invention may be made of several components that are joined together and some may be rigid. Suitable semi-rigid materials are such thermoplastic organic materials as polyethylene and polypropylene. An illustrative suitable thickness of the walls of sheath 21 using polyethylene or polypropylene is about 0.05 inch.

The sheath 21 has a sidewall 39, that in the embodiments that are shown, is circular in cross-section and an integral top wall 40 between the top end of wall 39 so that the peripheral surface of wall 39 continues the top surface of top wall 41. The wall 40 has an opening 41 that is above the longitudinal axis of sheath 21 and that extends completely across the top wall from the front segment of wall 40 to the opposite or rear segment of wall 39. For convenience, sidewall 39 is referred to as having four segments, viz., front segment, rear segment and the two side segments.

The rear segment of wall 39 has a top end opening or recess 42. The top end of the front segment of sidewall 39 has on its inner surface a tongue or rib 43. The rear sidewall segment of sidewall 40 has a similar rib 44 on its inside surface below recess 42. The ribs 43 and 44 extend arcuately in different horizontal planes and rib 44 is at a lower elevation than rib 43.

The front sidewall segment of sidewall 39 has a cavity as a hemispherically-curved wall portion 45 with its center of curvature being located about a point that would be at or close to a front sidewall segment lacking this hemispherical cavity. The wall portion 45 is provided with a circular opening 46 and the center of the circle is in horizontal alignment with the center of the radius of curvature of hemispherical wall portion 45. The hemispherical cavity in the front sidewall segment is only a short distance below rib 43. This distance is coordinated with the distance of travel of valve actuator overcap 23 for the purpose explained later.

The tubular shell or sheath 21 has a pair of opposing integral spaced-apart walls 47 and 48, that extend downwardly from top wall 40 at opening 41 so that the opposing surfaces of walls 47 and 48 provide a guide for the vertical travel of actuator overcap 23.

The sheath 21 also contains an intermediate transverse or horizontal wall 49 that extends from the rear segment of sidewall 39 to the front segment of sidewall 39. The wall 49 at the side edges of its top surface is connected to the bottom end of walls 47 and 48. Thus wall 49 is spaced from the side segments of sidewall 21. The wall 49 has a central opening 50 into which extends a top boss 51 of closure 26 in the final package, as described later. The wall 49 is connected to the front segment of sidewall 39 at the hemispherical cavity wall portion 45.

A hollow boss or tubular wall 52, of greater inner diameter than opening 50 to provide an annular shoulder stop by wall 49 for the top of closure 26, depends from wall 49 and is coaxial with opening 50. The bottom end portion of boss 52 is thicker than the top portion to provide a smaller inner diameter at that end of the cylindrical opening of hollow boss 52. The inner surface 53 of this end portion is tapered to the bottom edge. This construction provides an inner annular shoulder for engaging an undercut bottom portion of closure 26, as seen in FIG. 4.

The rear segment of sidewall 39 is thinner above wall 49 but below rib 40 to provide a vertical inner surface below which there is a downwardly and inwardly inclined inner surface portion. This vertical inner surface of a thinner segment of wall 39 is to provide clearance for part of overcap 23 as seen below.

The overlay cap 23 has a finger recess 54 in its top surface. The recess 54 extends from a central area to the rear end which is above the rear segment of sheath 21 when cap 23 is in opening 41. The outline of overcap 23 conforms in shape to opening 41 and has a size to be spaced very slightly from the walls 47 and 48 and inner surface of side wall 39 of sheath 21 at its front segment but overlies the rear segment of wall 39.

The overcap 23 has a central depending hollow cylindrical boss 55. The front segment of the bottom end of the wall of boss 55 is cut out or recessed to provide a front opening 56 from the bottom of boss 55 up almost to an annular inner shoulder 57. The inner surface of hollow boss 55 has a vertical groove 58 extending from the bottom of boss 55 to annular shoulder 57. The groove 58 is diametrically opposite the center of recess or wall opening 56 and receives rib 37 of button 22 so that the fine opening of disk 34 will be in alignment with the central vertical plane of recess 56 and thus in alignment with the center of opening 46 and the center of curvature for hemispherical cavity wall portion 45 of the front segment of sidewall 39 when spray is emitted.

The overcap 23 has a top horizontal wall 59 and a pair of downwardly extending vertical side flanges or skirts 60 and 61 that are curved in matching relationship with the curvature of walls 47 and 48. The top surface of wall 59 of overcap 23, except for finger recess 54, is flat and when mounted on sheath 21 is a continuation of the flat horizontal top surface of top wall 40 until first use of the package.

The overcap 23 also has a rear curved depending skirt 62 that is inwardly of the rear edge of wall 59 of overcap 23. The bottom portion of the rear or outer surface of skirt 62 has a grooved rib 63. The curvature of skirt 62 conforms to the rear segment of sidewall 40 so that the groove in rib 63 can be engaged by rib 44 of sheath 21. The front edge portion of wall 59 is thicker and the edge is provided with a groove 64 to engage rib 43 of sheath 21. The foreward end of each of skirts 60 and 61 has a depth only equal to the increased thickness of the forward end portion of wall 59 to avoid contact by either skirt with the hemispherical portion 45 of sheath 21 when cap 23 is depressed to the maximum lowered position shown in FIG. 9 for emitting areosol spray.

The inside surface of sidewall 39 adjacent the bottom end of sheath 21 has a pair of angular grooves 70 and 71 to receive a pair of annular ribs 72 and 73, respectively at the outer surface of a depending annular skirt or flange 74 of retaining disk 27. As seen in FIG. 4, bottle 25 is supported at its bottom by disk 27 when the latter is secured in the bottom portion of sheath 21 by engagement of ribs 72 and 73 in grooves 70 and 71.

The wall of disk 27 has a central aperture 75 and, is downwardly offset from a position a short distance inwardly of skirt 74 to provide first a downwardly and inwardly inclined top surface portion and then an upwardly inclined top surface portion to provide an annular recess wall portion. The upwardly inclined top surface portion engages a concave portion of the bottom of bottle 25. The heel of bottle 25 conforms generally to the curvature defined by the downwardly inclined surface portion mentioned above.

The dimensions of disk 27 and sheath 21 in relation to the dimensions of bottle 25 are such that the bottle is spaced from sidewall 39 of sheath 21 and contacts retaining disk 27 at the upwardly inclined top surface portion of the wall of disk 27 that is adjacent to opening 75. This contact is thus only at the bottom surface of bottle 25. If the final package is dropped, the momentum of bottle 25 will not force disk 27 out of its engagement with sheath 21, because the force created by this momentum will act on the inner annular recessed wall portion of disk 27 to provide an outer radial force to skirt 74. This force will maintain ribs 72 and 73 in tighter engagement in grooves 70 and 71. The disk 27 is provided with radial webs 76 contacting the under surface of the downwardly inclined annular wall portion of disk 27 with skirt 74 to provide transfer of this desirable force to skirt 74 when the package is dropped.

This overall combination of structure of disk 27 keeps bottle 25 within sheath 21 so that, if bottle 25 breaks, glass fragments that are impelled normal to the logitudinal axis of the bottle will be retained by wall 39 of sheath 21.

Referring to FIG. 11, the main difference in sheath 21, as compared with that of earlier figures, is that there is instead of wall portion 45 a hemispherical cavity wall portion 80, with a central opening 46, in the front wall segment of sidewall 39. The wall portion 80 has a smaller radius of curvature than hemispherical cavity wall portion 45. In this sheath 21, there is thus provided an arcuate fulcrum internal flange 82 intermediate the top portion of smaller cavity wall portion 80 and rib 43, because the former is below the elevation at which it can also function as a fulcrum point.

Figure 12:
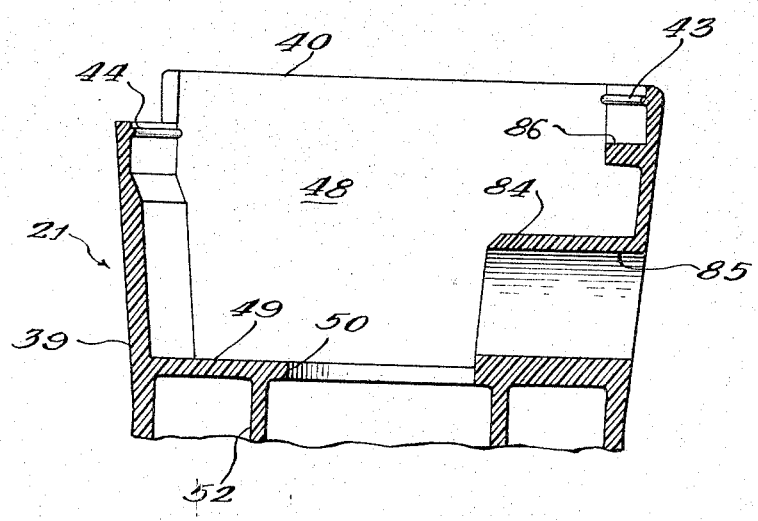

The construction of sheath 21 in the embodiment of FIG. 12 differs from the two earlier embodiments in that instead of the hemispherical cavity wall portion 45 or 80 of the front wall segment of sidewall 39 there is a cylindrical wall 84 extending inwardly from an opening 85 in the front wall segment of sidewall 39 as it would be constructed in the absence of cavity wall portion 45 or 80. The bottom of wall 84 is integral with an underlying part of a transverse wall 49.

The sheath 21 in the embodiment of FIG. 12 is provided with an intermediate fulcrum flange 86 having a planar distal edge rather than an arcuate edge as is the case for the distal edge of flange 82. Of course, it is not necessary that either edge has this configuration. The choice is determined partially by whether sheath 21 is of unitary, i.e., one-piece, molded construction, which is preferred or is made of several parts that are suitably joined.

The dimension and shape of sheath 21 of any of these embodiments is such that sidewall 39 of sheath 21 is entirely spaced from bottle 25. Thus a substantial impact force that would cause fracture of bottle 25 is absorbed by sheath 21 and not transferred to bottle 25.

The following is a description of the assembly and use of the package as described with respect to the preferred embodiment shown in FIGURES 1–10, inclusive. From this description the assembly and use of this package with sheath 21 of FIG. 11 or FIG. 12 will be obvious.

The aerosol package of the present invention is assembled as follows: The bottle 25 is filled with the aerosol product and capped with closure 27 on which is mounted in sealed relationship the valve assembly with its valve stem 24 extending upwardly as shown in FIG. 4. The spray button 22 is fully inserted in hollow boss 55 of overcap 23 so that rib 37 is in groove 58 and button 22 abuts shoulder 57. This assembly of button 22 and overcap 23 is placed in opening 41 of sheath 21 until it is fixed in a tongue-and-groove locking position, as shown in FIG. 4, by means of rib 43 that engages groove 64 and rib 44 that engages the groove of grooved rib 63.

The subassembly of filled bottle 25, closure 26 and the valve assembly is moved up through the bottom opening of sheath 21 until closure 26 touches hollow boss 52.

Further upward force causes the end portion of the wall of hollow boss 52 to move radially outwardly. The assembly including bottle 25, upon further upward movement causes closure 26 to be raised in boss 52 until the top peripheral part of closure 26 abuts the shoulder provided by wall 49 adjacent its opening 50. At this time the bottom end portion of the wall of hollow boss 52 returns to its initial position so that its inside bottom shoulder moves into engagement with the bottom inwardly offset portion of closure 26. The bottle 25 is now supported within and by sheath 21.

As seen in FIG. 4, the top end of stem 24 is within hollow button 22 but below bore 29. The disk 27 is snapped into place in the bottom opening of sheath 21 and an inner annular part of it engages the bottom of bottle 25, as described earlier. The packaged product has the periphery of the top surface of cap 23 at the same elevation as the top surface of top wall 40 of sheath 21, except that portion of the periphery containing the end part of the finger recess 54. This completes the assembly of the packaged product which is shipped and ultimately placed on the retailer's shelf. The locking of overcap 23 with sheath 21 prevents inadvertent operation of the valve assembly.

To provide aerosol spray from the package a person applies a downward force on overcap 23 sufficient to overcome the tongue-and-groove locking support of overcap 23. This force moves groove 64 below rib 43 and grooved rib 63 below rib 44 to the position shown in FIG. 8. It is noted that now the top end of stem 24 is partially, but not fully, in bore 29. The walls 47 and 48 maintain disk 34 of button 22 in alignment with opening 46. The downward force is continued on overcap 23 until the top end of stem 24 reaches shoulders 35, whereby further relative movement between button 22 and stem 24 cannot occur by further depression of overcap 23.

The further downward movement of overcap 23 forces tube 24 downwardly to open the valve assembly whereby aerosol product is forced, by the pressure within bottle 25, out bore 36 of stem 24, through bores 29 and 30 of button 22 and finally through the fine aperture in disk 34 where it is emitted as a fine spray.

When the valve assembly is a continuous flow type, the spray will continue so long as valve overcap 23 is held at this lowermost position. When it is a metered type only a metered quantity of spray is emitted, even though overcap 23 is held at this position.

It may be noted that valve actuator overcap 23 is preferably pushed straight down by a finger in recess 54. However, an application of a force at the rear end only of overcap 23 results in an apparent toggle or tilting motion, but the construction of the present package provides a downward component of force to move button 22 down, i.e., the direction required by the design of the type of valve assembly to operate it when button 22 is fully depressed. Thus both vertical and apparent toggle applied forces operate by vertical movement the valve stem to obtain aerosol product from the package. None of the prior art constructions permit this versatility.

When the downward force on overcap 23 is removed, the spring of the valve assembly raises stem 24 to its initial elevation and thus raises button 22 and overcap 23 to a position below that shown in FIG. 8. When this happens the valve of the continuous type of valve assembly is closed to stop further emission of spray. Of course, stem 24 remains in abutment with shoulders 35. The overcap 23 is now unconnected with sheath 21 and thus is free floating, except it is connected by button 22 to stem 24.

The foregoing operation completes the dislodgement of overcap 23 from its locking position and completes one cycle of use.

After the cycle of first use, the top surface of wall 59 of overcap 23 is now below the transverse or horizontal plane passing through rib 43 and thus is substantially below the top surface of top wall 40, e.g., below it by one-sixteenth inch. A short visual examination will indicate this relationship between the two top surfaces. If overcap 23 has been dislodged from its locking relationship with sheath 21 by a person forcing it down to the position shown in FIG. 8 without the one cycle of spray operation there will be a similar appearance. Thus if a person tampers with the package of the present invention to dislodge overcap 23 from its locked position in the top of sheath 21, a potential buyer will see that this has happened and would be expected not to buy the product that may have had one or more cycles of operation with loss of aerosol product. Tampered goods can be easily spotted by store employes and removed from the shelves.

It is seen from the foregoing that the package of this invention has a number of advantages. For example, it has a construction that (1) permits the use of an uncoated glass bottle for packaging aerosol at a higher internal pressure than used safely heretofore, (2) greatly minimizes the chance of breakage and, (3) if such occurs, minimizes the chance of fragments escaping to cause personal injury. The construction also maintains the bottle within the sheath in the event that the package is dropped to the floor or the like. As a matter of fact, the construction more tightly retains the bottom disk in the sheath, due to the force created by the downward momentum of the bottle when the package hits a floor or the like in its downward travel. The construction further provides protection against an appreciable impact force being transmitted to the bottle when the package receives such force including a force at the side of the package; if the force is greater, only part of the force is transmitted to the sidewall of the bottle, because the sheath is spaced from the bottle.

The sheath cooperates with the retaining disk to cradle the bottle by supporting it at the top and bottom in a manner to prevent lateral movement of the bottle relative to the sheath. The sheath also includes in its construction the advantages of a cap. The top portion of the sheath surrounds the top of the bottle and components that are above the bottle by a rigid structure due to its transverse intermediate wall in cooperation with the pair of walls depending from the top wall even though the material, that is used, is semi-rigid at the wall thickness used. This intermediate wall also serves to support the hollow boss that cooperates with it to retain the top and the shoulder of the bottle and the closure in a fixed position relative to and maintained a substantial space from the sheath.

In the foregoing description of the process of assembly of the package without any tampering or cycle of use of it, reference has been made to the fact that stem 24 is outside bore 29 when the package is assembled. This is preferred. Obviously, it can be partially within bore 29 so long as the initial assembly of filled and capped bottle 25 into sheath 21, with overcap 23 in locked position on sheath 21, does not, move stem 24 downward following full insertion in bore 29 to about shoulders 35 to the extent that later the movement by unlocking cap 23 by a downward force does not immediately open the valve. Otherwise, it would not be possible for cap 23 to be raised by stem 24 later to close the valve.

From the foregoing description of the preferred embodiment it is seen that it is possible to provide a safe, convenient, tamper-indicating package using a glass bottle, which may be coated with polyvinyl chloride or some other elastomeric material. For economy the bottle is preferably uncoated.

The sheath can be readily molded as a one-piece or unitary component of semi-rigid material. The sheath can be called alternatively a tubular shell having (1) top wall with an opening, preferably a central opening, extending to a rear segment of sidewall (main wall of the shell) preferably with a recess in the rear segment of the side wall, (2) a pair of walls depending from the top wall at the opening, (3) a transverse wall connected to the pair of walls and apertured between them and (4) depending hollow boss supported by the transverse wall and in alignment with the aperture. Only three other parts, namely, an actuator overcap, conventional spray button and a bottom retaining disk are required to package a filled aerosol glass bottle having a valve assembly mounted on its closure. The insertion of the spray button in the overcap and the placing of the latter into locked position in the sheath by automatic machinery is relatively low cost and simple because of structure afforded by components of the present invention. Similarly, equipment necessary to move a filled bottle into position and then move upwardly a retaining disk is relatively simple.

For the foregoing reasons, it is believed that the package has a number of advantages and yet provides a substantial degree of protection against and in case of breakage.

The sidewall of the sheath can be made of numerous outer configurations that correspond generally to the configurations that would be desired for a glass bottle from the standpoint of sales appeal. The foregoing preferred embodiment is one of such shapes.

As mentioned earlier, the sheath can be made by combining a number of subcomponents that are later joined but this is not desired for best utilization of the product.

The walls 47 and 48 are described above in the preferred embodiment as being generally extending from the front to the rear of the package. Obviously, the invention can utilize such pair of walls having a general direction that is from side to side or somewhere between that and front to rear. The preferred embodiment provides guide walls for an overcap that extends from front to rear and provides a better assurance of correct direction of spray.

Obviously, the valve actuator can be made by manufacturing overcap 23 and button 22 as a single component but the utilization of a presently available button 22 provides an advantage that is attainable by the particular structure of the overcap of the present invention.

When overcap 23 is depressed to its lowermost position shown in FIG. 9 at which point spray is being emitted from the package, top wall 59 at its rear end is still spaced above the top end of rear segment of sidewall 39 within the recess 42. In the event that the valve assembly becomes stuck in the open position, it will not force stem 24 upwardly. In a continuous type of valve assembly, the result is that spray will continue to be emitted and this will result in loss of product. The preferred construction of the package utilizes a structure of sheath 21 in which there is a space between wall 39 and the bottom of recess 42 in the rear segment of sidewall 39. A simple tool or a fingernail can be inserted in this space for the purpose of lifting overcap 23 at its rear end. At the position of overcap 23, when aerosol spray is being emitted, the bottom surface of the front end of overcap 23 is just above the hemispherical cavity portion of the front segment of wall 39. Thus the raising of the rear end of overcap 23 will move the front of end overcap 23 to abut that cavity wall portion. Further downward movement of the front end is not possible. As a result, a further lifting force on the rear end of overcap 23 results in an easy upward movement of overcap 23 about a fulcrum point provided by its contact at the front with that cavity wall portion. Thus stem 24 is lifted to shut off the valve assembly.

The foregoing paragraph describes a structure that provides in the front segment of the sidewall a fulcrum point. In the embodiments of FIGS. 11 and 12, flanges 82 and 86 provide this beneficial structure, namely, a fulcrum point for overcap 23 when it becomes necessary to lift it to shut off the flow of aerosol product.

Instead of the preferred simple rib-and-groove construction of the bottom end of sheath 21 and of disk 27 that provides means to unite these two elements, other uniting means, such as threads will be apparent to one skilled in the art.

The foregoing description has referred to U.S. patents. It indicates some of the features disclosed in the patents. These patents are merely illustrative of certain features that may or may not be disclosed in earlier prior art.

Instead of the tongue-and-groove structure, that is provided by ribs 43 and 44 and grooved ribs 63 and 64 to support overcap 23 by sheath 21, so that at least a portion of the marginal upper surface of top wall 59 is at the elevation of the upper surface of top wall 40 until there is a sufficient downward force on overcap 23, other support means can be provided.

For example, overcap 23 can be properly located and a strip of material adhered to these top surfaces to provide such support until the strip is removed or is broken or cut at the juncture of these marginal surfaces. Alternatively, frangible or stretchable webs of material can extend between top wall 40 and overcap 23.

The use of such webs would require modification of the package. For example, top 40 would be made integral with overcap 23 as an extension of top wall 59 and connected to the latter by such webs. The extension would be constructed to engage sidewall 39 and walls 47 and 48, e.g., by tongue-and-groove fastening to provide the equivalent of top wall 40. Stretchable webs would have insufficient force, when stretched by manually moving overcap 23 to provide connecting engagement of button 22 with valve stem 24, to return overcap 23 to its initial supported position. Yet stretchable webs would provide some degree of resistance to downward movement of overcap 23 from its initial supported position at which button 22 is not fully engaged by valve stem 24.

Frangible webs would provide similar tamper-resisting support until broken. These constructions provide the desired tamper-indicating feature.

Various modifications of the package and its components of the present invention, other than those modifications mentioned above, will be apparent to one skilled in the art from the foregoing disclosure. The embodiments have been presented for the purpose of illustration. The invention is limited only by the claims that follow:

We claim:
1. An article of manufacture which comprises a tubular shell having
(1) a sidewall with a front segment, a rear segment and side segments,
(2) a top wall
  (a) having an opening providing at least part of an opening at the top end of the shell and
  (b) extending from the top end of the sidewall toward the longitudinal axis of the shell,
(3) a pair of opposed walls depending from the top wall at the opening,
(4) an intermediate transverse wall extending from and between opposed segments of the sidewall and united to the pair of opposed pendant walls, said transverse wall having an opening below the opening in the top wall, and
(5) a hollow boss having a wall depending from the transverse wall, with
  (a) the opening of the transverse wall being above and of smaller transverse dimension than the hollow portion of the boss to provide by the transverse wall adjacent its opening a downwardly-facing stop shoulder and
  (b) the downwardly-extending wall of the boss having on its inner surface an upwardly-facing shoulder spaced below the transverse wall to engage an inwardly offset bottom portion of a closure for a container while a top portion of the closure abuts the stop shoulder provided by the transverse wall, said sidewall of said shell having an opening in its front segment above said transverse wall and said shell having on opposite sides of its longitudinal axis an inner surface that extends horizontally adjacent the periphery of the opening at the top end of the shell and that is shaped to provide at each of said opposite sides one of the two surfaces of a tongue-and-groove locking structure.

2. The article of claim 1 wherein
 (1) the tubular shell has a one-piece molded construction of a plastic material such that the portion of the sidewall below the transverse wall has a sufficient thickness of the plastic material to provide semi-rigidity to said portion of the sidewall,
 (2) the opening in the top end of the shell extends from the front segment of the sidewall to the rear segment of the sidewall,
 (3) the pair of opposed pendant walls
  (a) extend from the front and rear segments of the sidewall and
  (b) have their non-facing surfaces spaced from and facing the side segments of the sidewall
 (4) the transverse wall
  (a) extends from the front and rear segments of the sidewall and
  (b) has its side edges spaced from facing side segments by dimensions corresponding to the spacing of the pair of opposed pendant walls at their juncture with the transverse wall,
 (5) the hollow boss is cylindrical and has an inner annular rib to provide adjacent the bottom of the boss the upwardly-facing shoulder, and
 (6) the openings in the transverse wall and front segment of the sidewall are circular.

3. The article of claim 2 wherein
 (1) the rear segment of the side wall has a recess as part of the opening in the top end of the shell,
 (2) the opening in the top wall extends to the recess,
 (3) the inner surfaces of the shell providing part of a tongue-and-groove locking structure are arcuate and located at the top end portion of the front segment of the sidewall and adjacent and below the recess in the rear segment of the sidewall, and
 (4) the shell below said inner surface of the front segment having a rearwardly extending wall to provide a support wall on its top portion.

4. The article of claim 3 wherein the front segment of the sidewall has a rearwardly-extending wall portion surrounding the opening in the front segment to provide said support wall.

5. The article of claim 4 wherein the rearwardly-extending wall portion of the front segment is hemispherical in shape to provide a cavity in the front of the shell and the opening in the front segment is in the rear portion of the hemispherical wall portion.

6. The article of claim 5 wherein the transverse wall extends from the front segment at the hemispherical wall portion below the opening in the front segment.

7. The article of claim 3 wherein the tubular shell has a cylindrical wall extending rearwardly from the front segment of the sidewall, surrounding the opening in the front segment of the sidewall, and open at its rear end and wherein said support wall is a flange extending rearwardly from the front segment of the sidewall above the rearwardly extending cylindrical wall.

8. The article of claim 3 wherein
 (1) the front segment of the sidewall has a hemispherically-shaped wall portion to provide a cavity in the wall with the opening in the front segment being at the rear of the hemispherical wall portion,
 (2) the transverse wall extends from the front segment at the hemispherical wall portion below the opening in the front segment, and
 (3) said support wall is a flange extending normal to the longitudinal axis of the shell from the front segment above the hemispherical wall portion, said flange providing a support wall within the top part of the shell as a fulcrum for a lever force.

9. An article of manufacture which comprises:
 (1) a tubular shell having the construction recited in claim 1,
 (2) an assembly within the shell and including
  (a) an open-mouthed container of a frangible material, having the mouth at the top of the container,
  (b) a closure hermetically sealing the mouth of the container and at least partially within the hollow boss, said closure being supported by said upwardly-facing shoulder of said boss, and
  (c) a valve assembly supported by and partially within said closure in hermetically sealed relationship, said valve assembly including a hollow valve stem extending upwardly.
 (3) a valve actuator within the opening of the top wall of the shell and between the pair of walls and having
  (a) a cylindrical bore in vertical alignment with said valve stem,
  (b) an orifice in communication with said cylindrical bore to emit a spray of fluid product from said cylindrical bore,
  (c) a top wall extending laterally in opposite directions and having a portion of peripheral surface at each laterally-extending end shaped to provide the complementary surface for a tongue-and-groove locking relationship with said shaped inner surfaces of the top end portion of the shell, said top wall of the actuator providing at the periphery of its top surface a continuation of the top surface of the top wall of the shell adjacent to the opening in the top wall of the shell when the valve actuator is in said locking relationship with said shell, and
 (4) means mounted on the shell at its bottom and supporting the container at its bottom portion, said container being spaced from said sidewall and said valve actuator being vertically moveable below said opening at the top wall of the shell and between said pair of opposed walls pendant from said top wall of the shell by a force overcoming said locking relationship to move said orifice into facing axial alignment with said opening in the front segment of the sidewall of the shell, and to move said valve stem into the cylindrical bore for full engagement of the valve actuator with the valve stem.

10. The article of claim 9 wherein the frangible container is uncoated.

11. The article of claim 10 wherein the frangible container is glass.

12. The article of claim 11 wherein the article includes within the container an aerosol product with a pressure within the container above atmospheric pressure.

13. The article of claim 12 wherein the pressure is in excess of 25 p.s.i.g.

14. The article of claim 9 wherein
 (1) the tubular shell has a one-piece molded construction of a plastic material such that the portion of the sidewall below the transverse wall has a sufficient thickness of the plastic material to provide semi-rigidity to said portion of the sidewall,
 (2) the opening in the top end of the shell extends from the front segment of the sidewall to the rear segment of the sidewall,
 (3) the pair of opposed pendant walls
  (a) extend from the front and rear segments of the sidewall and
  (b) have their non-facing surfaces spaced from and facing the side segments of the sidewall,
 (4) the transverse wall
  (a) extends from the rear segments of the sidewall and
  (b) has its side edges spaced from facing side segments by dimensions corresponding to the spacing of the pair of opposed pendant walls at their juncture with the transverse wall, (5) the hollow boss is cylindrical and has an inner annular rib to provide adjacent the bottom of the boss the upwardly-facing shoulder, and (6) the openings in the transverse wall and front segment of the sidewall are circular.

15. The article of claim 14 wherein (1) the rear segment of the sidewall has a recess as part of the opening in the top end of the shell, (2) the opening in top wall extends to the recess, (3) the inner surfaces of the shell providing part of a tongue-and-groove locking structure are arcuate and located at the top end portion of the front segment of the sidewall and adjacent and below the recess in the rear segment of the sidewall, and (4) the shell below said inner surface of the front segment having a rearwardly extending wall to provide a support wall on its top portion.

16. The article of claim 15 wherein the front segment of the sidewall has a rearwardly-extending, hemispherically-shaped cavity to provide by its top portion the support wall, said opening in the front segment being at the rear portion of the hemispherical wall portion.

17. The article of claim 16 wherein the transverse wall extends from the front segment at the hemispherical wall portion below the opening in the front segment.

18. The article of claim 17 wherein the frangible container is uncoated glass, the shell is made of a thermoplastic material of the group consisting of polypropylene and polyethylene and the article includes within the container an aerosol product with a pressure within the container in excess of 25 p.s.i.g.

19. The article of claim 18 wherein the shell at its bottom end portion has an inner surface complementary to a peripheral surface of said container-supporting means mounted on the bottom of the shell, said container-supporting means being a disk with a panel portion and a downwardly-extending peripheral skirt containing said peripheral surface, said panel portion being offset downwardly from a marginal portion of the panel portion and then upwardly to a central opening, with the bottom of the container being concave and engaged for support by said upwardly-extending part of said panel portion of said disk.

20. The article of claim 19 wherein the valve actuator includes as separable parts (1) a spray button containing said cylindrical bore and said orifice, and (2) an overcap including (a) said top wall and (b) a hollow boss depending from said top wall of the overcap, said boss having a recess opening in its wall at the bottom portion and an annular shoulder within the boss, said spray button supported within said hollow boss with said orifice facing said recess in the wall of said boss of the overcap, and said spray button and overcap having complementary opposing surface configurations such as to prevent relative rotation about the axis of said boss of the overcap.

21. An article of manufacture which comprises a tubular shell having (1) a sidewall with a front segment, a rear segment and side segments, (2) a top wall (a) having an opening providing at least part of an opening at the top end of the shell and (b) extending from the top end of the sidewall toward the longitudinal axis of the shell, (3) a pair of opposed walls depending from the top wall at the opening, (4) an intermediate transverse wall extending from and between opposed segments of the sidewall and united to the pair of opposed pendant walls, said transverse wall having an opening below the opening in the top wall, and (5) a hollow boss having a wall depending from the transverse wall, with (a) the opening of the transverse wall being above and of smaller transverse dimension than the hollow portion of the boss to provide by the transverse wall adjacent its opening a downwardly-facing stop shoulder and (b) the downwardly-extending wall of the boss having on its inner surface an upwardly-facing shoulder spaced below the transverse wall to engage an inwardly offset bottom portion of a closure for a container while a top portion of the closure abuts the stop shoulder provided by the transverse wall, said sidewall of said shell having an opening in its front segment above said transverse wall.

22. An article of manufacture which comprises:

(1) a tubular shell having the construction recited in claim 21, (2) an assembly within the shell and including (a) an open-mouthed container of a frangible material, having the mouth at the top of the container, (b) a closure hermetically sealing the mouth of the container and at least partially within the hollow boss, said closure being supported by said upwardly-facing shoulder of said boss, and (c) a valve assembly supported by and partially within said closure in hermetically sealed relationship, said valve assembly including a hollow valve stem extending upwardly, (3) a valve actuator within the opening of the top wall of the shell and between the pair of walls and having (a) a cylindrical bore in vertical alignment with said valve stem, (b) an orifice in communication with said cylindrical bore to emit a spray of fluid product from said cylindrical bore, (c) a top wall shaped to conform in outline to the shape of the opening in the top wall of the shell, and (4) means mounted on the shell at its bottom and supporting the container at its bottom portion, said container being spaced from said sidewall and said valve actuator being vertically moveable between said pair of opposed walls pendant from said top wall of the shell to move said orifice into facing axial alignment with said opening in the front segment of the sidewall of the shell.

23. The article of claim 22 wherein the article includes means to support said valve actuator within the opening in the top wall of the tubular shell at an elevation to provide at least a portion of the marginal upper surface of the top wall of the valve actuator at the same elevation and as a continuation of the adjacent upper surface of the top wall of the tubular shell, said support means being constructed to be inoperative to provide such support upon downward movement of the valve actuator relative to the tubular shell to a position at which the valve actuator is operatively connected to the valve stem in the cylindrical bore of the valve actuator, whereby tampering and possible use of the article is indicated when said portion of the upper surface of the top wall of the actuator is below the adjacent upper surface of the top wall of the tubular shell.

24. The article of claim 23 wherein opposite segments of the inner surface of the sidewall of the tubular shell and an opposing pair of edges of the valve actuator have complementary rib and groove surfaces to provide said support means.

25. An article of manufacture which comprises a valve actuator overcap for an aerosol button having a central bore extending from the bottom of the button and a side orifice in communication with the central bore, said overcap having:
(1) a top panel having four edges,
(2) a pair of skirts depending from opposite edges of the panel, and
(3) a hollow boss depending centrally from the panel to provide a wall defining an opening to receive the button, said wall having a recess at the bottom segment and at another segment one of complementary vertical rib and groove surfaces whereby the button with the other of the rib and groove surfaces when in the boss has its orifice in alignment with the recess and relative rotation is prevented, said overcap having adjacent to each of the other opposite edges of the panel, outer surfaces shaped to provide at each the complementary surface for a tongue-and-groove locking relationship.

26. The article of claim 25 wherein one of said shaped outer surfaces is at one of said other opposite edges of the panel and the overcap has a downwardly-extending flange inward of the other of said other opposite edges with the outer depending surface having the other of said shaped surfaces.

References Cited

UNITED STATES PATENTS

| | | | |
|---|---|---|---|
| 2,855,130 | 10/1958 | Holser | 222—386.5 |
| 2,887,273 | 5/1959 | Anderson et al. | 222—402.13 X |
| 3,062,411 | 11/1962 | Miles | 222—182 X |
| 3,157,317 | 11/1964 | Ramsbotham | 222—183 |

ROBERT B. REEVES, *Primary Examiner.*

K. N. LEIMER, *Assistant Examiner.*

UNITED STATES PATENT OFFICE
CERTIFICATE OF CORRECTION

Patent No. 3,347,423                          October 17, 1967

Erwin P. G. Rahn et al.

It is hereby certified that error appears in the above numbered patent requiring correction and that the said Letters Patent should read as corrected below.

Column 16, line 73, before "rear" insert -- front and --; column 17, line 12, before "top" insert -- the --.

Signed and sealed this 5th day of November 1968.

(SEAL)
Attest:

Edward M. Fletcher, Jr.
Attesting Officer

EDWARD J. BRENNER
Commissioner of Patents